June 18, 1940.  H. NIEDERREITHER  2,204,816
SAFETY STRUCTURE FOR HIGH PRESSURE APPARATUS
Filed March 31, 1937
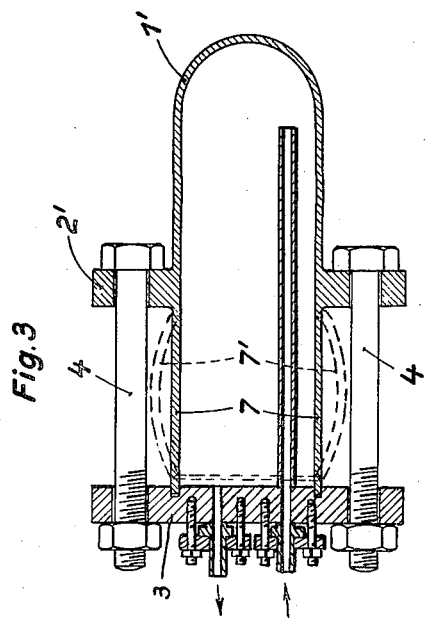
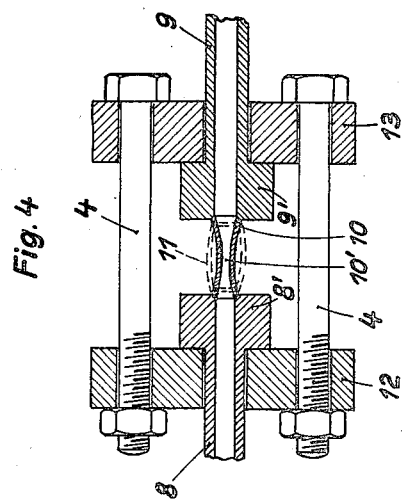
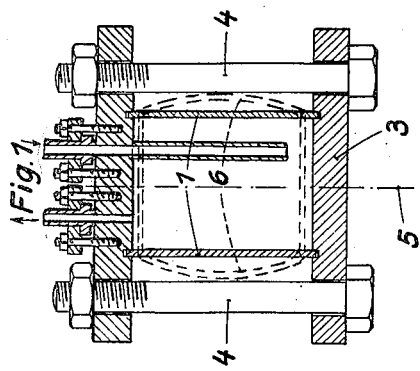
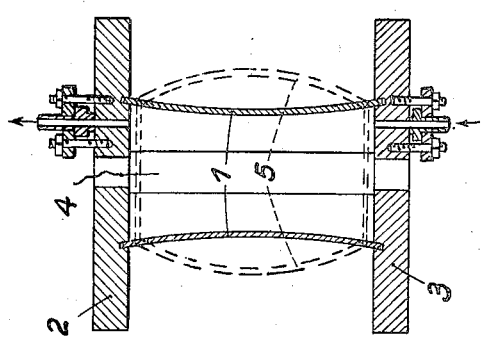
Inventor:
Hans Niederreither
By: Mason & Porter
Attorneys Patented June 18, 1940

2,204,816

UNITED STATES PATENT OFFICE 2,204,816

SAFETY STRUCTURE FOR HIGH PRESSURE APPARATUS

Hans Niederreither, Munich, Germany

Application March 31, 1937, Serial No. 134,155
In Germany March 31, 1936

9 Claims. (Cl. 137—111)

The present invention relates to the protection of vessels, containers and pipes or the like from destruction by injurious internal overpressure.

Vessels, containers, pipes or the like have been protected, thus far in the majority of cases by safety valves, from injurious internal overpressures liable to break, split or in any other way destroy the walls of the vessels concerned. Safety valves are however suited for such a protection only in case the injurious internal overpressure develops comparatively slowly so that the over-pressure can be relieved through the cross section of the valve before it attains a dangerous degree.

As the increase of the pressure takes place very rapidly in the case of explosion, there will arise, in spite of the complete opening of the valve, a dangerous overpressure resulting in a destruction of the vessel. Therefore, and in order that the pressure gases are allowed to escape more quickly and against less resistance, it has been sought to provide local weakenings in the wall of the vessel which expose a larger section of passage; this section, however, unlike safety valves, is not susceptible to further enlargement as the pressure increases, remaining substantially unchanged, irrespective of any continued increase of the pressure. The gas then escapes against a lesser resistance. But this increase of cross section is comparatively small so that in many instances the vessel cannot be prevented from bursting. Apart from this the splinters of the broken plate also expose the neighbourhood to danger.

It is an object of the present invention to obviate these inconveniences by a method which exposes sufficiently large sections of passage of various size in accordance with the intensity and the power of an explosion and the pressure increase thereof. Thus the larger the internal overpressure developed, the larger the cross section exposed and the greater the velocity of the escaping overpressure.

This invention relates to the fundamental that the wall of the vessel or a portion thereof is by the design, viz. from the first, relieved from tension in a definite direction so that even in the case of high overpressure a tension is prevented from acting in this particular direction. The consequence thereof is that when an internal overpressure is developed this wall or portion of the wall undergoes a deformation corresponding to the overpressure, which deformation results in a shortened distance between the ends of the wall. By this shortening a sufficiently large cross section is afforded for the rapid escape of the overpressure.

Several embodiments of the invention are illustrated by the accompanying drawing in which Figs. 1 and 2 diagrammatically show vessels provided with side walls susceptible of being deformed when subjected to a disruptive internal overpressure; Fig. 3 shows a container the side wall of which can be deformed in part and Fig. 4 represents a piping constructed according to the present invention. The pressure vessel shown by Fig. 1 is provided with a side wall made of a cylindrical length of tubing 1 which is closed at its ends by cover plates 2 and 3; as indicated by the figures of the drawing, these cover plates function as comparatively sturdy non-yieldable or unyielding abutments relative to the side walls of the vessel or container. The two cover plates are firmly pressed by tie rods 4 upon the tube length 1. Thus the tube length is, in the direction of the tube axis 5 subjected to a pressure; that is, the material thereof is not subjected to tension in the direction of the tube axis 5 but to compression. When by an explosion a sufficiently high internal overpressure is developed therein the length of tube is caused to assume the approximately spherical shape represented by the dotted lines 6. Thus the distance between the ends of the tube is substantially shortened and the overpressure is allowed to escape, through the comparatively large sections of passage exposed, before it reaches a magnitude which would cause the vessel to burst. Obviously this result is possible only by the fact that in the direction of the tube axis the wall of the vessel is relieved from tension.

While the preferred shape of the wall of the vessel is that of a hollow open ended shell in the form of a body of rotation, it is not to be construed as necessarily limited to this form. Although the tube of Figure 1 has been shown as of cylindrical shape, it may have any other shape, e. g. ellipsoidal or paraboloidal but it should preferably not be spherical from the first since the spherical shape approximates that obtained as a result of deformation.

Fig. 2 shows a design of the length of tube which is particularly advantageous in a certain respect. The tube 1 represents a hollow rotation body the wall of which is in its axial section a parabola, ellipse or the like open towards the outside. This shape affords the advantage that under a pressure the tube 1 is tightened more and more against the cover plates 2 and 3 and upon a definite overpressure it tends quite suddenly to pass to the spherical shape indicated by the dotted lines 5. In this instance the two cover plates are firmly pressed on the length of tube by means of a concentric screw spindle 4.

Instead of the entire side wall of the vessel, only a portion thereof may be relieved from tension. Such a construction is shown by Fig. 3. The bomb-shaped pressure vessel 1' has a flange 2' serving as an abutment for the spindles 4 which press the cover plate 3 on the open end of the said vessel 1'. The portion 7 of the vessel 1' is thus relieved from tension and will under a correspondingly high internal overpressure assume an approximately spherical shape as indicated by the dotted lines 7'.

Preferably the portion 7 of the vessel is designed as an independent body which is not integral with the remaining shell of the vessel 1' but merely pressed, with the interposition of a gasket, on the vessel ending e. g. at the flange 2'. Upon deformation it can be replaced at will, and the vessel proper is not subject to damage. Preferably the wall of the portion 7 of the vessel is made thinner than the wall of the vessel 1'. Analogously the new protection may also be applied to pipings as Fig. 4 shows. The tube length 10, of suitably reduced size and the wall of which is thinner than that of the pipes 8 and 9, is pressed between the nipples 8' and 9' by means of the screw spindles 4 and the glands 12 and 13. At 10' the tube 10 is of reduced diameter and on the whole it corresponds to the lengths of tube described with reference to Fig. 2. In the event of excess pressure, it assumes the spherical shape indicated by the dotted lines 11. Protective arrangements of this description are advantageously disposed also in the neighbourhood of the outlet and inlet ends of pressure pipe lines leading into vessels. They prevent the propagation of a pressure wave in the vessels.

While I have disclosed means in the form of a grooveway for securing the tube ends against expansion, it is to be understood that no such means is essential to the success of the invention since the compression manifested on the respective ends of the tube contributes toward an avoidance of substantially any expansion of the tube end diameters.

What I claim as my invention, and desire to secure by Letters Patent, is—

1. A piping system comprising pipe sections having flanged ends, a length of relatively weak and more readily deformable tubing, of a material susceptible to permanent deformation at a predetermined internal over-pressure, positioned between said ends, said ends including shallow recesses for receiving the ends of the tubing and therewith preventing any increase of the diameter of the tubing ends, and means engaged with said end flanges for holding the tubing under compression, said tubing being adapted for resisting normal pressures within the piping system and for permanent yielding at intermediate points of its length under the said internal over-pressure and thereby becoming sufficiently shorter so as to free the said tubing from its recesses, whereby the internal over-pressure is relieved.

2. A piping system as in claim 1, in which the length of tubing has a lesser diameter intermediate its ends than the diameter of the ends thereof.

3. In a device of the character described, comparatively unyielding opposed walls, a tubular member engaged at its ends and held under compression by said walls and adapted to be subject to internal pressure, said tube being of a material which is suddenly and permanently deformable upon attainment of a predetermined internal over-pressure to suddenly relieve said over-pressure by expansion of the tube intermediate its ends, with contraction of the length of the tube, resulting in the provision of large pressure releasing end clearances intervening said ends and said walls.

4. Apparatus according to claim 8 in which the side walls of the shell are of a concave-convex shape, the convex side comprising the inner surface thereof which is subjected to the internal pressure.

5. Apparatus according to claim 8 in which the abutment heads are held together by spaced tensioning elements designed to compress and unload the shell of tension.

6. A piping system as in claim 1, in which the side walls of the tubing are of a concave-convex shape, the convex side comprising the inner surface thereof which is subjected to the internal pressure.

7. Apparatus for insuring safety against internal over-pressures having the characteristics of abrupt explosion-like increases of pressure comprising a pair of opposed comparatively unyielding pressure applying cover means, and a hollow open ended shell compressed endwise between said cover means and adapted to be subjected to internal pressures of explosive magnitude, said shell being more readily deformable than said end cover means when subjected to a disruptive internal over-pressure which will suddenly reduce the length of the shell and form large pressure releasing clearances between the shell ends and said cover means.

8. Apparatus for insuring safety of conduits and the like against disruption by internal over-pressure, particularly with respect to abrupt explosion-like increases of pressure, comprising a pair of opposed comparatively unyielding pressure applying abutment heads, and a hollow open ended shell in the form of a body of rotation compressed endwise between said heads and subject to internal pressure, said shell being of a material which is more readily deformable than the said abutment heads when subjected to a disruptive internal over-pressure which will suddenly reduce the length of the shell and form large pressure releasing clearances between the shell ends and said heads.

9. Apparatus for insuring safety against internal over-pressures having the characteristics of abrupt explosion-like increases of pressure, comprising a hollow shell having at least one open end, a pair of opposed comparatively unyielding pressure applying means associated with the surface of the said shell and segregating a peripheral area of the said shell between them in a state of longitudinal compression, one of the said pressure applying means functioning as a cover means for an end opening, at least a portion of the said segregated peripheral area being more readily deformable than any other portion of the said shell or the said opposed pressure applying means when the apparatus is subjected to a disruptive internal over-pressure which will a large pressure releasing clearance between the shell end and its pressure applying cover means.

HANS NIEDERREITHER.